US011805035B2

United States Patent
Rangarajan et al.

(10) Patent No.: US 11,805,035 B2
(45) Date of Patent: *Oct. 31, 2023

(54) INTERVAL FLOW-BASED INBAND TELEMETRY

(71) Applicant: Arista Networks, Inc., Santa Clara, CA (US)

(72) Inventors: Vijay Rangarajan, Bangalore (IN); Padmanabh Ratnakar, Karnataka (IN); Sahil Midha, Karnataka (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/669,911

(22) Filed: Feb. 11, 2022

(65) Prior Publication Data

US 2022/0239571 A1    Jul. 28, 2022

Related U.S. Application Data

(63) Continuation of application No. 16/738,891, filed on Jan. 9, 2020, now Pat. No. 11,258,684.

(51) Int. Cl.
*H04L 43/067* (2022.01)
*H04L 43/026* (2022.01)
(Continued)

(52) U.S. Cl.
CPC .......... *H04L 43/067* (2013.01); *H04L 43/026* (2013.01); *H04L 43/062* (2013.01);
(Continued)

(58) Field of Classification Search
CPC ... H04L 43/067; H04L 43/026; H04L 43/062; H04L 43/0858; H04W 24/04; H04W 24/10; H04W 28/0289
See application file for complete search history.

(56) References Cited

U.S. PATENT DOCUMENTS

| 11,019,172 B2 * | 5/2021 | Bhide ................. H04L 67/568 |
| 11,075,847 B1 | 7/2021 | Kwan et al. |

(Continued)

FOREIGN PATENT DOCUMENTS

WO    2020137320 A1    7/2020

OTHER PUBLICATIONS

Kumar et al., Internet—Draft (Expires: Sep. 6, 2018) Inband Flow Analyzer draftkumar-ifa-00 (15 pages); https://tools.ietf.org/html/draft-kumar-ifa-00.
(Continued)

*Primary Examiner* — Redentor Pasia
(74) *Attorney, Agent, or Firm* — Fountainhead Law Group P.C.

(57) ABSTRACT

This disclosure presents several embodiments of a device configured to perform inband telemetry tracking. The device is configured to store a flow table that tracks metrics of a detected packet flow that passes through the device. More specifically, the flow table tracks several telemetry metrics, each telemetry metric being specific to a tracking time period, and tracking statics based only on packets of the packet flow that were received during that specific time period. At an end of an export time period (which is longer than a tracking time period), the device transmits all stored telemetry metrics from the flow table to a collector.

20 Claims, 6 Drawing Sheets

(51) Int. Cl.
*H04L 43/0852* (2022.01)
*H04L 43/062* (2022.01)
*H04W 24/04* (2009.01)
*H04W 28/02* (2009.01)
*H04W 24/10* (2009.01)

(52) U.S. Cl.
CPC ......... *H04L 43/0858* (2013.01); *H04W 24/04* (2013.01); *H04W 24/10* (2013.01); *H04W 28/0289* (2013.01)

(56) References Cited

U.S. PATENT DOCUMENTS

| | | | |
|---|---|---|---|
| 2013/0046819 A1* | 2/2013 | Bocirnea | G16H 40/20 709/203 |
| 2017/0149644 A1* | 5/2017 | Rapoport | G06F 11/3476 |
| 2017/0262304 A1* | 9/2017 | Williams | G06F 11/34 |
| 2018/0241664 A1 | 8/2018 | Singh et al. | |
| 2018/0288083 A1* | 10/2018 | Yermakov | H04L 43/0817 |
| 2019/0014395 A1 | 1/2019 | Anand et al. | |
| 2019/0258677 A1 | 8/2019 | Beedgen et al. | |
| 2019/0280927 A1* | 9/2019 | Filsfils | H04L 45/24 |
| 2020/0028771 A1 | 1/2020 | Wong et al. | |
| 2020/0186465 A1 | 6/2020 | Venkata et al. | |
| 2020/0213932 A1 | 7/2020 | Fallon et al. | |
| 2020/0252435 A1 | 8/2020 | Robertson et al. | |
| 2020/0267059 A1 | 8/2020 | Mozumdar et al. | |
| 2021/0084530 A1* | 3/2021 | Song | H04L 43/04 |
| 2021/0092061 A1 | 3/2021 | Zhou et al. | |
| 2021/0112011 A1* | 4/2021 | K S | H04L 41/40 |
| 2021/0182699 A1* | 6/2021 | Koyyalummal | G06N 5/02 |
| 2021/0218647 A1 | 7/2021 | Rangarajan et al. | |
| 2021/0218651 A1 | 7/2021 | Rangarajan et al. | |
| 2021/0409282 A1* | 12/2021 | Patki | G06F 16/2379 |
| 2022/0070051 A1* | 3/2022 | Mortensen | G06N 3/088 |

OTHER PUBLICATIONS

Changhoon Kim et al., In-band Network Telemetry (INT), Jun. 2016 (28 pages); https://p4.org/assets/INT-current-spec.pdf.
N. V. Tu, J. Hyun, G. Y. Kim, J. Yoo and J. W. Hong, "INTCollector: A High-performance Collector for In-band Network Telemetry," 2018 14th International Conference on Network and Service Management (CNSM), 2018, pp. 10-18.

\* cited by examiner

| Flow ID | Source Address | Destination Address | Source Port | Destination Port | Protocol | Telemetry Metric Tracking Period 1 | Telemetry Metric Tracking Period 2 | ... | Telemetry Metric Tracking Period N |
|---|---|---|---|---|---|---|---|---|---|
| 1 | 216.3.128.12 | 127.0.0.1 | 80 | 80 | TCP/IP | | | | |
| 2 | 211.3.128.30 | 127.0.0.2 | 20 | 21 | FTP | | | | |
| 3 | 127.0.0.1 | 210.1.2.2 | 554 | 554 | RTSP | | | | |

FIG. 4

INTERVAL FLOW-BASED INBAND TELEMETRY

CROSS-REFERENCE TO RELATED APPLICATION

This application is continuation of U.S. patent application Ser. No. 16/738,891, filed Jan. 9, 2020, which is incorporated by reference herein in its entirety.

This application is related to a co-pending U.S. patent application Ser. No. 16/738,876, entitled "SYSTEMS AND METHODS FOR FLOW-BASED INBAND TELEMETRY" (filed on Jan. 9, 2020) which is incorporated by reference herein in its entirety.

BACKGROUND

The present disclosure relates to inband telemetry techniques. In particular, the present disclosure relates to a network device that obtains inband telemetry data from packets and periodically reports aggregated flow-based telemetry metrics for several smaller intervals.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 4 shows an exemplary flow table, in accordance with some embodiments of the disclosure;

DETAILED DESCRIPTION

Figure 1:
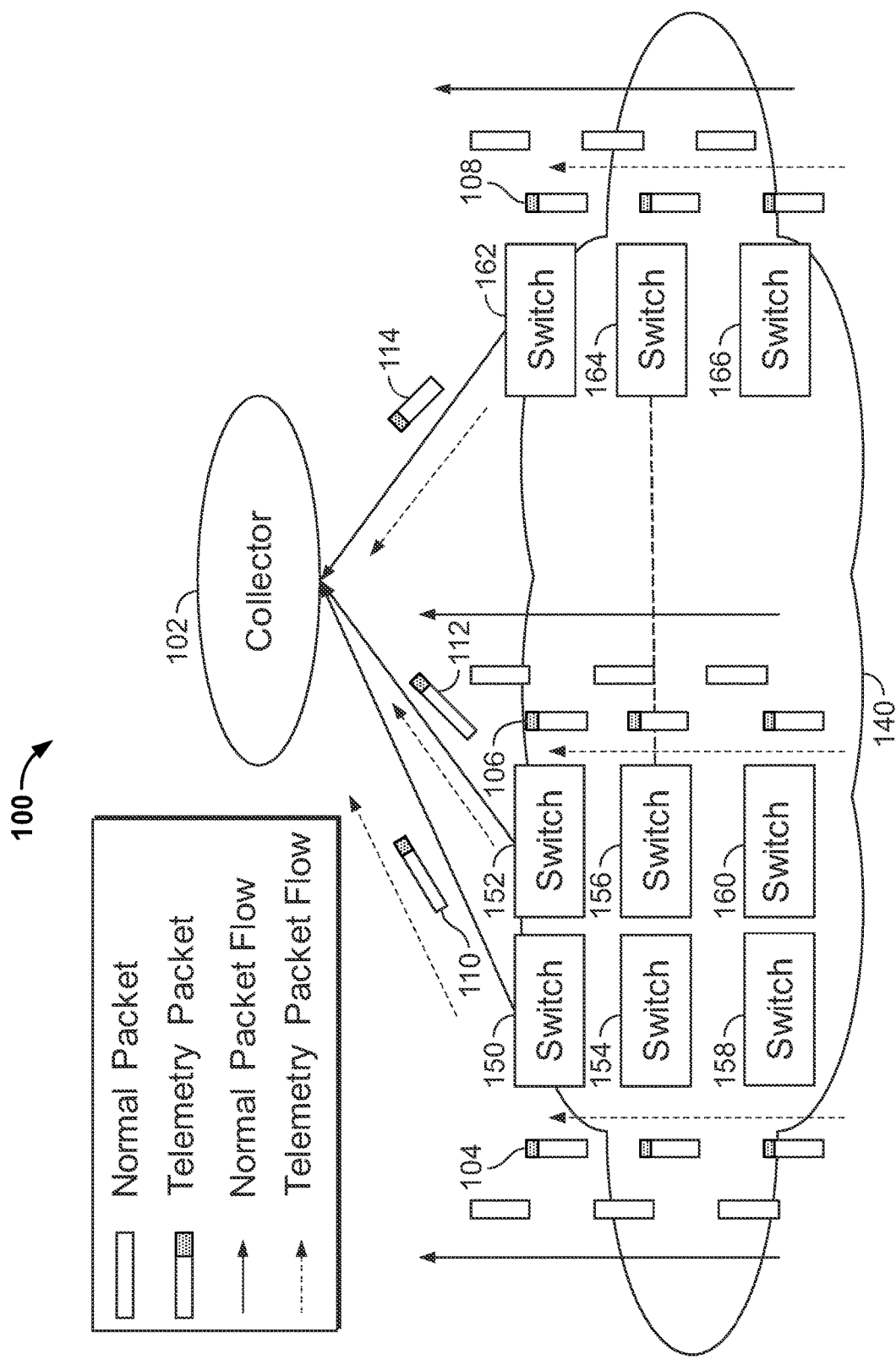
FIG. 1 shows an exemplary system for collecting inband telemetry data, in accordance with some embodiments of the disclosure.

Network systems frequently collect telemetry data metrics (e.g., latency, congestion, etc.) in order to monitor performance and health of the network. In some implementations, devices on the network may gather telemetry metrics and report these metrics to a collector. For example, the telemetry metrics may be gathered within the control-plane of the network, or by using inband telemetry (INT) techniques that allow the telemetry data (e.g., per-hop telemetry data) to be embedded into the packets themselves (or into duplicates of sampled packets).

To perform such telemetry functions, a network device (e.g., an INT node) may gather network telemetry metrics by analyzing packets it handles. The network device may, for example, identify a flow of packets and calculate telemetry metrics based on telemetry data contained in each packet of the flow (e.g., contained in the INT portion of the header). The telemetry metrics may be averaged over an export time period and reported to a collector at the end of such an interval. If the chosen export time period is too small, however, the collector frequently becomes overwhelmed. If the chosen export time period is too large, on the other hand, the collector will not have access to granular telemetry metrics. For example, a measurement of average latency in a flow over a large time period is not helpful when trying to pinpoint an exact time when a latency spike (e.g., a microburst) occurred.

To solve this problem, disclosed herein is a telemetry system having a network device that divides each export time period into several smaller time periods (tracking periods). The network device computes aggregate (e.g., averaged) telemetry metrics for each smaller tracking time period, instead of computing aggregate telemetry metrics for the entire export time period. For example, the network device may compute and locally store a telemetry metric based on telemetry data from packets of the flow received during each smaller time period. At the end of each larger export time period, the network device forwards some or all locally stored telemetry metrics to a collector. In this way, the collector receives forwarded metrics at large intervals, thus preventing the collector from becoming overwhelmed by frequent reports. The forwarded metrics received by the collector, however, include granular telemetry metrics for tracking time periods that are smaller than the export time period, allowing the collector to better analyze, for example, short-term spikes in latency.

In some embodiments disclosed herein, the network device may store computed flow telemetry metrics for more than one export time period. For example, the network device may locally store N computed flow telemetry metrics (e.g., one metric for each of N tracking time periods), while each export time period may contain less than N tracking time periods. In such implementations, when all stored aggregate telemetry metrics are reported at the end of a current export time period, the network device will report both: flow telemetry metrics calculated for tracking time periods that occurred during the current export time period; and flow telemetry metrics calculated for tracking time periods that occurred during a preceding export time period. This approach provides additional redundancy to the system, because even if a report for the previous export time period is lost, the collector will receive some telemetry metrics for the previous export time period, when metrics are reported at the end of the current export time period.

FIG. 1 shows an exemplary system 100 for collecting inband telemetry (INT) data of network 140, in accordance with some embodiments of the disclosure. System 100 may use multiple devices to collect telemetry metrics (e.g., latency, packet path, queue length and congestion, etc.) for packets that traverse network 140 without invoking control plane functionality. To accomplish this, system 100 may use INT aware devices that receive a packet and add telemetry to the packet before that packet is forwarded. INT data stored in a packet may be forwarded to collector 102, which may be configured to receive telemetry data from multiple devices in network 140. In some embodiments, the collector may use the telemetry data to analyze network performance as a whole, and to perform network management functions based on the analysis. For example, collector 102 may change routing policy, activate more switches, generate network performance reports, and/or perform any other network management function.

System 100 may include multiple INT-aware switches 150-166. While system 100 shows switches, other packet-forwarding devices, such as hubs, routers or bridges, may also be used instead of, or in addition to, switches. INT-aware switches 150-166 may be configured to recognize packets (e.g., packets 104, 106, 108) that include INT data (e.g., an INT header). When such a packet is received by one of switches 150-166, that switch may add telemetry data to the packet before that packet is forwarded to a next switch. For example, one of switches 150-166 may add its own address to the packet. In another example, the switch may also add timestamps indicating when the packet was received by the switch and when it was forwarded to a next switch. One of switches 150-166 may also add information regarding its queue size, and whether congestion was experienced when processing the received packet.

In some embodiments, one of switches 150-166 may compute one or more telemetry metrics based on the data stored in a packet that it receives. In some embodiments, metrics are computed for every packet. Alternatively, metrics may be computed based on a certain percentage (e.g., 5%) of sampled packets. For example, switch 150 may receive packet 104, which was previously forwarded by switches 158 and 154, where both switches 158 and 154 added INT data to packet 104. Switch 150 then computes telemetry metrics based on data in the INT portion of packet 150. For example, switch 150 may compute latency of the last hop experienced by that packet (e.g., hop from switch 154 to switch 150) by comparing a timestamp indicating when packet 150 was sent by switch 154, and timestamp indicating when packet 150 was received by switch 150. Switch 150 may also compute other metrics (e.g., per hop metrics), such as whether congestion was experienced during last hop and/or what the size of the queue was during the hop. In some embodiments, switch 150 may also compute other metrics, for example, switch 150 may determine what path packet 104 took (e.g., the path may include (switch 158, switch 154)).

Switch 150 may send INT data from packet 104 to collector 102. In some embodiments, switch 150 may send metrics calculated based on INT data to collector 102. For example, such data may be sent every time a packet is processed. In some embodiments, collector 102 is configured to receive such INT data from all switches 150-166. For this reason, it's possible collector 102 may become overwhelmed when too much data comes in at the same time. To overcome this problem, modified system 200 is described in FIG. 2.

Figure 2:
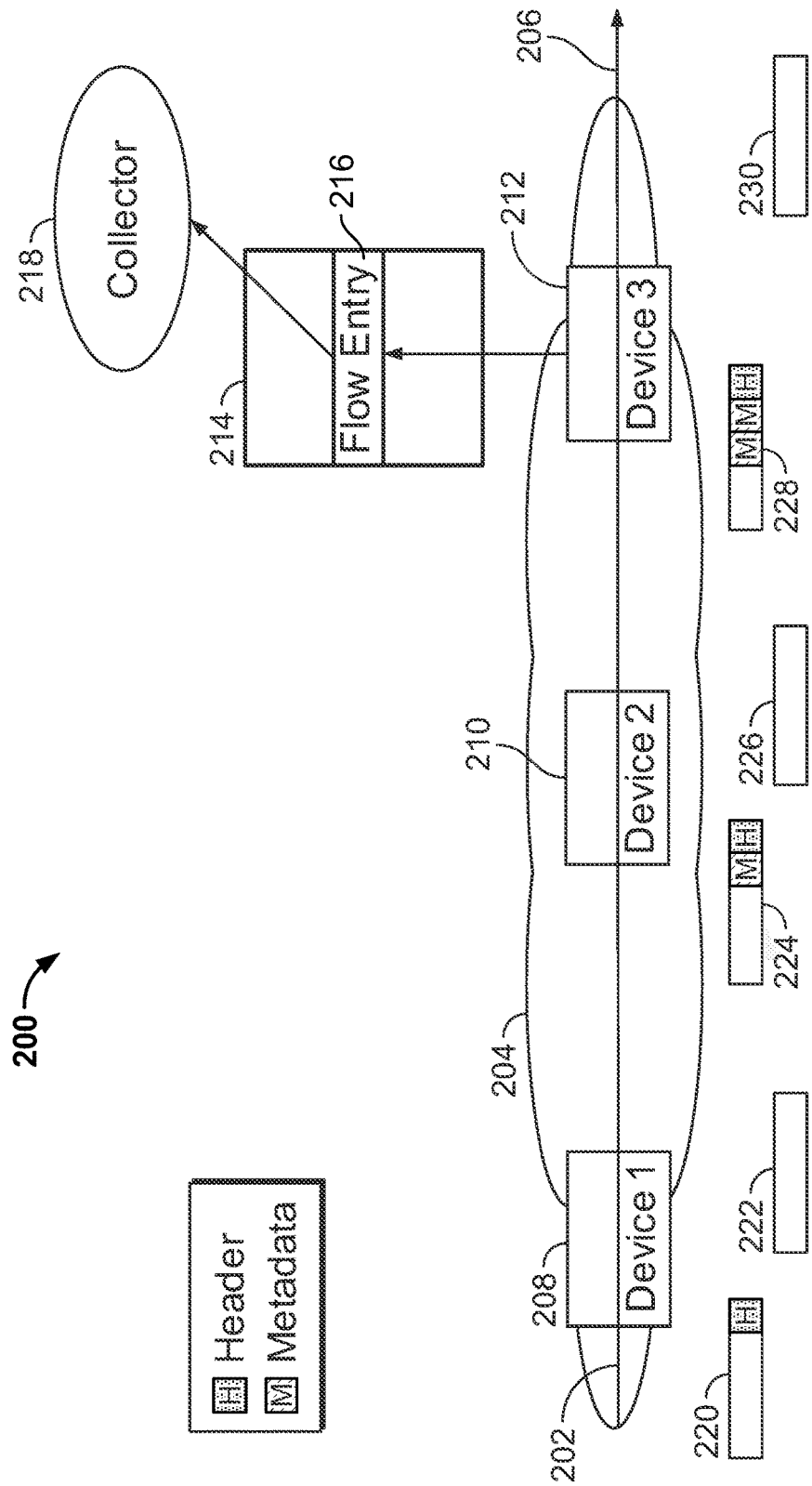
FIG. 2 shows another exemplary system for collecting inband telemetry data, in accordance with some embodiments of the disclosure.

FIG. 2 shows an exemplary system 200 for collecting inband telemetry (INT) data of network 204, in accordance with some embodiments of the disclosure. In some embodiments, system 200 includes the same devices as shown in system 100. For example, network 204 may be the same as network 140, device 212 may be the same as switch 150, device 210 may be the same switch 154, device 208 may be the same as switch 158, and collector 218 may be the same as collector 102. In some embodiments, each of device 208, 210, and 212 may be an INT-enabled packet forwarding device (e.g., a router, a switch, or a hub).

As described above, INT-enabled devices 208-212 may examine incoming packets to identify packets that include an INT header. FIG. 2 shows a progress of a packet as it travels along network 204. For example, a packet 220 may enter network 204 with payload 222. In some embodiments, packet 220 may arrive from a device 202 that is not a part of INT-enabled network 204 (e.g., packet 220 may arrive from a user device or from a switch with no INT capabilities.) Device 208 may then add a header (H) to packet 220, while payload 222 remains the same. Additionally, device 208 may add INT telemetry data (M) to packet 220. In some embodiments, the telemetry data may be the same as described above in relation to FIG. 1 (timestamp data, congestion data, address data, queue-size data, etc.).

Subsequently, device 210 receives packet 224 which includes the header and telemetry data added by device 208. Payload 226 remains the same. Upon detecting the presence of the INT header, device 210 may add additional INT telemetry data to packet 224. Similarly, device 212 receives packet 228 which includes the header and telemetry data added by devices 208 and 210. Payload 230 remains the same. Upon detecting the presence of the INT header, device 212 handles the packet as will be described below.

As shown in FIG. 2, some or all network devices 208-212 may include a flow table for tracking network metrics that are aggregated for a detected flow. For example, flow tables may be kept by devices that forward packets outside of INT-enabled network 204. In some embodiments, all devices of network 204 may maintain flow tables. In some embodiments, the flow table may be stored only by a last device on the edge of the INT-enabled network 204 (e.g., by device 212). In some embodiments, every INT-enabled of the INT-enabled network 204 may maintain its own flow tables. For example, device 212 may include flow table 214. An exemplary flow table is shown below in FIG. 3. In some embodiments, device 212 maintains a table that lists all packet flows that it has recently handled. For example, two packets may be determined to belong to the same flow if they share the following data: source address, destination address, source port, destination port, and protocol. In some embodiments, other methods to detect flow may be used (e.g., shared port and destination address only). In some embodiments, other ways to detect flows may be used (e.g., based on source address and destination only).

For example, whenever a packet is received by device 212, the device may check if that packet belongs to a flow that is already present in flow table 214. If not, device 212 may create a new entry 216 in flow table 214. Device 212 then populates entry 216 with information that is based on INT data from packet 228. For example, entry 216 may include latency data, congestion data, path data, queue data, any other network telemetry data or any combination of the above.

If the packet belongs to an already-existing flow entry, device 212 updates the relevant flow table entry based on INT data from packet 228. For example, device 212 may store calculated aggregated statistical values based on INT data from packet 228 and data from previously received packets from the same packet flow. Device 212 may calculate and store a variety of statistical values, e.g., minimum, maximum, average, variance, jitter, standard deviation, mode, or any combination thereof. For example, for a latency metric, device 212 may calculate and store in the flow table aggregated data for a per-hop latency of packets of the flow to which packet 228 belongs. In some embodiments, device 212 calculates and stores in the one or more of: minimum latency, maximum latency, average latency, variance of latency, jitter of latency, standard deviation of latency, mode of latency, or any combination thereof in a flow table entry. Device 212 may then forward packet 228 outside of network 204, e.g., to endpoint device 206 or to a switch that is not INT-enabled. In some embodiments, device 212 may, in addition to storing an aggregated metric for the flow, also store metrics derived solely from the last received packet of the flow.

At certain time intervals (e.g., periodically or a-periodically) device 212 may forward aggregated data stored in flow table 214 to collector 218. For example, device 212 may forward that data every minute or every 30 seconds. In some embodiments, device 212 may forward the data on demand. Compared to system 100, system 200 reduces the amount of transmissions received by collector 218 from devices 208-212 because aggregated INT data is sent instead of data from every packet. Collector 218 may then take network actions based on all received data (e.g., generated warnings, changes in packet-forwarding policies, etc.). In some embodiments, device 212 may in addition to the aggregated metric also forward metrics calculated based on the last received packet of the flow.

In some embodiments, device 212 may collect flow-based aggregated metrics for time-tracking time periods that are smaller than a longer export time period. For example, if an export period is 30 second-long, device 212 may collect flow-based aggregated metrics for 5-second tracking periods or 10-second tracking periods (or periods any size smaller than the export period). Device 212 may use a flow table (as shown in FIG. 4) to store a plurality of aggregated metrics corresponding to respective tracking periods.

In some embodiments, device 212 may track metrics for N tracking time periods, where N is any integer number. For example, for each respective one of N tracking periods, device 212 may track one or more metrics corresponding to that period and based on data from packets of the respective tracking period. The number N may be selected manually or automatically. Metrics for each respective time period of N tracking time periods may be computed based on INT information from packets received during that respective time period. At an end of an export time period (that is larger than each tracking period) device 212 may transmit to collector 218 all stored metrics for each of the N tracking time periods. In some embodiments, device 212 may transmit to collector 218 only some of the stored metrics for all N time periods. In one implementation, N tracking time periods may span more than one export period. In this case, when stored metrics for all N tracking time periods are reported at the end of a current time period, some metrics collected during the current export time period will be reported along with some metrics collected during a preceding export time period.

In some embodiments, in addition to storing metrics corresponding to each of the N tracking time periods, device 212 may also keep an aggregated metric computed for the entire export period. For example, information from stored metrics of all N tracking time periods may be aggregated together (e.g., by averaging). This export period-specific aggregate metric (e.g., latency) may be refreshed at the beginning of each export period. Such export period-specific aggregate metrics may be reported at the end of an export time period in addition to or instead of stored metrics for all N tracking time periods.

Figure 3:
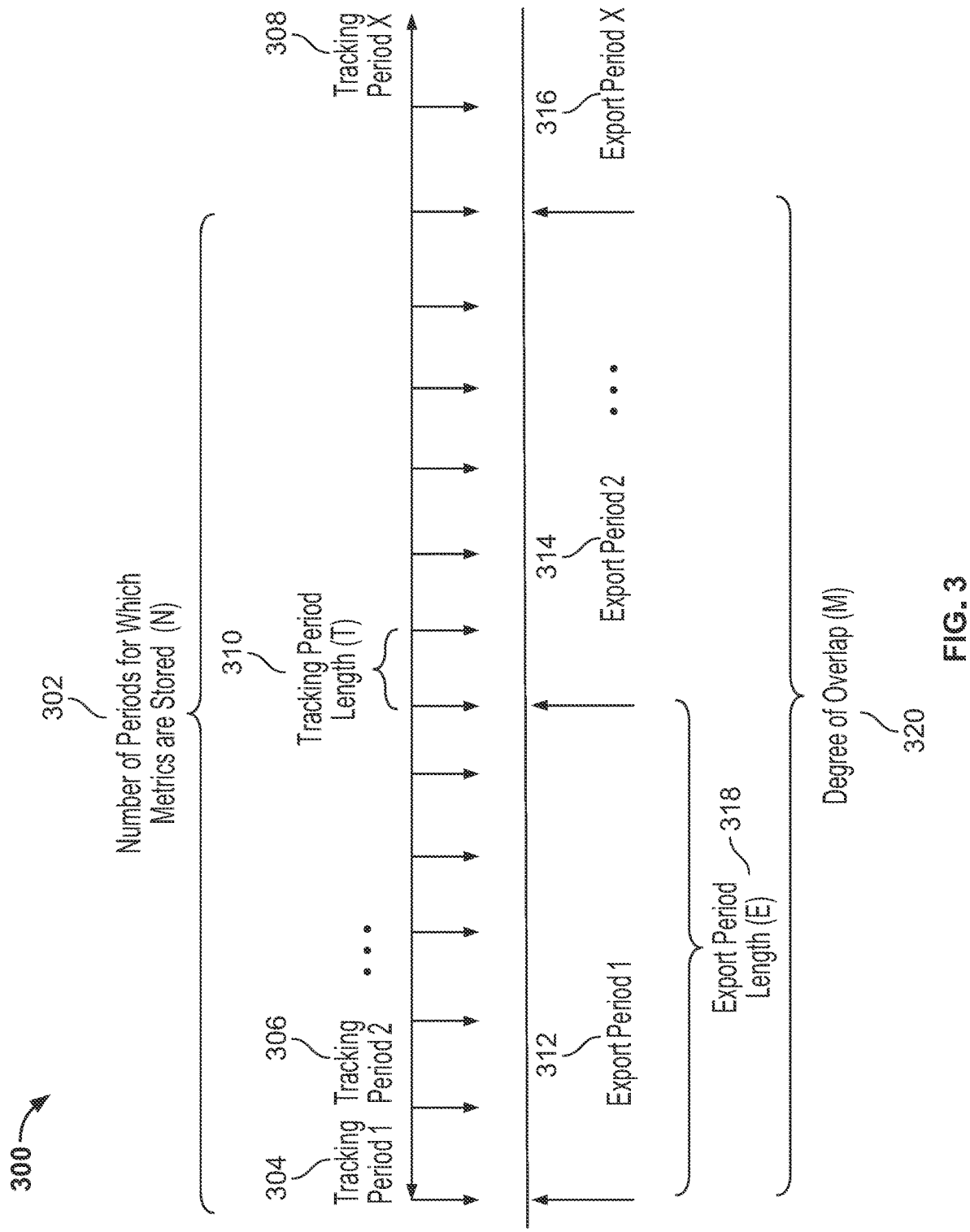
FIG. 3 shows exemplary intervals for collecting telemetry data, in accordance with some embodiments of the disclosure.

FIG. 3 shows exemplary intervals 300 for collecting telemetry data, in accordance with some embodiments of the disclosure (e.g., as described above in relation to FIG. 2). For example, tracking and export intervals depicted in FIG. 3 may be used by a device (e.g., device 212) to aggregate and report telemetry data to collector 218. However, any other telemetry metric (e.g., queue size, congestion, path) may be tracked in the same manner.

The device may track and store a telemetry metric (e.g., average per-hop latency metric) aggregated from data (e.g., INT data) contained in packets received during each tracking period 304-308. For example, the device may compute and store average latency for packets received during tracking period 304, and then compute and store average latency for packets received during tracking period 306, etc. In some embodiments, the device may store average latency for up to N tracking periods 302 (e.g., for 12 tracking periods). For example, a respective average latency metric may be started for each respective tracking period of N tracking periods 302. N may be any integer number. In such embodiments, when $N+1^{st}$ telemetry metric is calculated, the device may store the new metric but delete the oldest stored telemetry metric. In this way, no more than N telemetry metrics (each metric corresponding to one of the N tracking periods) are stored at any time. In some embodiments, this data may be tracked per flow and stored in a flow table as shown in FIG. 4.

At an end of each time period 312-316, the device may report to a collector (e.g., collector 218) all metrics (e.g., average latency metrics) stored in the memory of the device. For example, at the end of export time period 312, the device may report to the collector metrics computed for 6 tracking periods that occurred during export time period 312. In another example, at the end of export time period 314, the device may report to the collector metrics computed for 12 tracking periods that occurred during export time period 312 and export time period 314. In this way, because metrics are reported that were collected across more than one export period, a measure of redundancy is achieved. For example, if transmission that occurred at the end of period 312 was lost, the transmission that occurred at end of period 314 may be used to recover some of the lost data. In some embodiments, the device may include time stamps along with each reported telemetry metric to uniquely identify the tracking period for which the metric is being reported.

Length of tracking period 310 (T) may be computed based on the length of the export period 318 (E), the maximum number of metrics that may be stored at the same time 302 (N) and based on a degree of overlap 320 (M). As show, the degree of overlap (M) is equal to 2 (meaning that redundancy data will be provided across two export time periods). However, any other integer number may be used. For example, a value of M=1 will result in no overlap and no redundancy, while a value of M=3 will result in overlap across three export time periods. In some embodiments, length of tracking period 310 (T) may be computed according to formula T=(M*E)/N. For example, as shown, N=12, and M=2. In this scenario, if the length of the export time period (E) is 30 seconds. N can be computed to be equal to (2*30)/12=5 seconds. However, any value of M, N, and E can be used.

In addition to or instead of reporting telemetry metrics for tracking periods 304-308, the device can also report telemetry metrics for the entire export period. For example, at the end of export period 312, control circuitry may report the average per-hop latency of all packets received during period 312.

In some embodiments, the tracking metrics are stored only for tracking periods that are considered active (e.g., time periods during which at least one packet was received). For example, if no packets were received for tracking period 306, no telemetry metric (e.g., latency) will be stored for that tracking period, and that tracking period will not count toward the limit of N actively stored time periods.

FIG. 4 shows an exemplary flow table 400, in accordance with some embodiments of the disclosure. For example, flow table 400 may be flow table 214 stored in memory of an INT enabled network device (e.g., device 216). Table 400 is shown with three packet flows (1, 2, and 3), however, any number of flows may be stored.

Each row of the flow table 400 represents a flow tracked by device 216. Column 402 may contain flow IDs of each flow. Rows 404-412 may identify each flow by source address, destination address, source port, destination port, and protocol. In some embodiments, the device may treat any packet that includes the same source address, destination address, source port, destination port, and protocol as belonging to the same flow. For example, if a device were to receive a packet with metadata indicating a source address to be 216.3.128.12, destination address to be 127.0.0.1, source port to be 80, destination port to be 80 and protocol to be TCP/IP, the device will determine that that packet is part of flow "1." If a packet is received that is not part of an existing flow, a new flow entry may be created. e.g., as row 4.

Flow table 400 may also include aggregated INT statistics for each flow for a certain number of tracking periods (e.g., N tracking periods). For example, column 414 may track average per-hop latency of the flow for a first tracking period (e.g., period 304). Whenever the device receives a packet of flow 1 during the first tracking period, the column 414/row 1 entry may be updated to include data from the newly received packet. For example, if flow "1" has average per-hop latency of 15 ms (over 2 packets) during the first tracking period, and then the device receives a packet belonging to flow "1" and indicating per-hop latency of 30 ms during the first tracking period, the column 414/row 1 entry may be updated with a new average to be 20 ms (over 3 packets). In some embodiments, each cell in some or all of columns 414-418 may include multiple values (e.g., separate values for each hop). For example, flow "1" may include 2 hops, and latency information may be stored (e.g., in column 414) separately for "hop 1" of flow "1" and for "hop 2" of flow "1." In another example, flow "2" may include 3 hops, and congestion information may be stored (e.g., in column 418) separately for "hop 1" of flow "2" for "hop 2" of flow "2," and "hop 3" of flow "2."

Similarly, the average latency of packets of flow 1 may be tracked for a second tracking period (e.g., period 306) in column 416, and for Nth time period (e.g., period 308) in column 418. In some embodiments, columns may be recycled. For example, when the device needs to track latency metric for $N+1^{st}$ tracking period, the device may overwrite data stored in column 414 to store the average latency for the $N+1^{st}$ tracking period. In some embodiments, cells of table 400 may also include a timestamp identifying the tracking time period. Average per-hop latency may be similarly tracked for tracking periods 1-N for flow 2 and flow 3. In addition to latency, any other latency telemetry statistic (e.g., minimum latency, maximum latency, variance of latency, jitter of latency, standard deviation of latency, mode of latency, or any combination thereof) may also be stored in table 400 for each flow for a plurality of tracking periods. Furthermore, other telemetry metrics (congestion, path, queue size) may also be stored in table 400.

The content of flow table 400 may be periodically reported to the collector (e.g., collector 218). For example, content of flow table 400 may be reported at an end of each export period (e.g., periods 312-316). In some embodiments, flow table 400 is not cleared after an export and will always retain data for N tracking periods (e.g., flow table 400 may retain N respective metrics, each corresponding to one of N tracking periods). In some implementations, content of flow table 400 may be accessed on demand by command line interface call (e.g., from a user device). For example, when a user issues issue a command to the device via a command line, the device may return all or some of the data in flow table 400.

Figure 5:
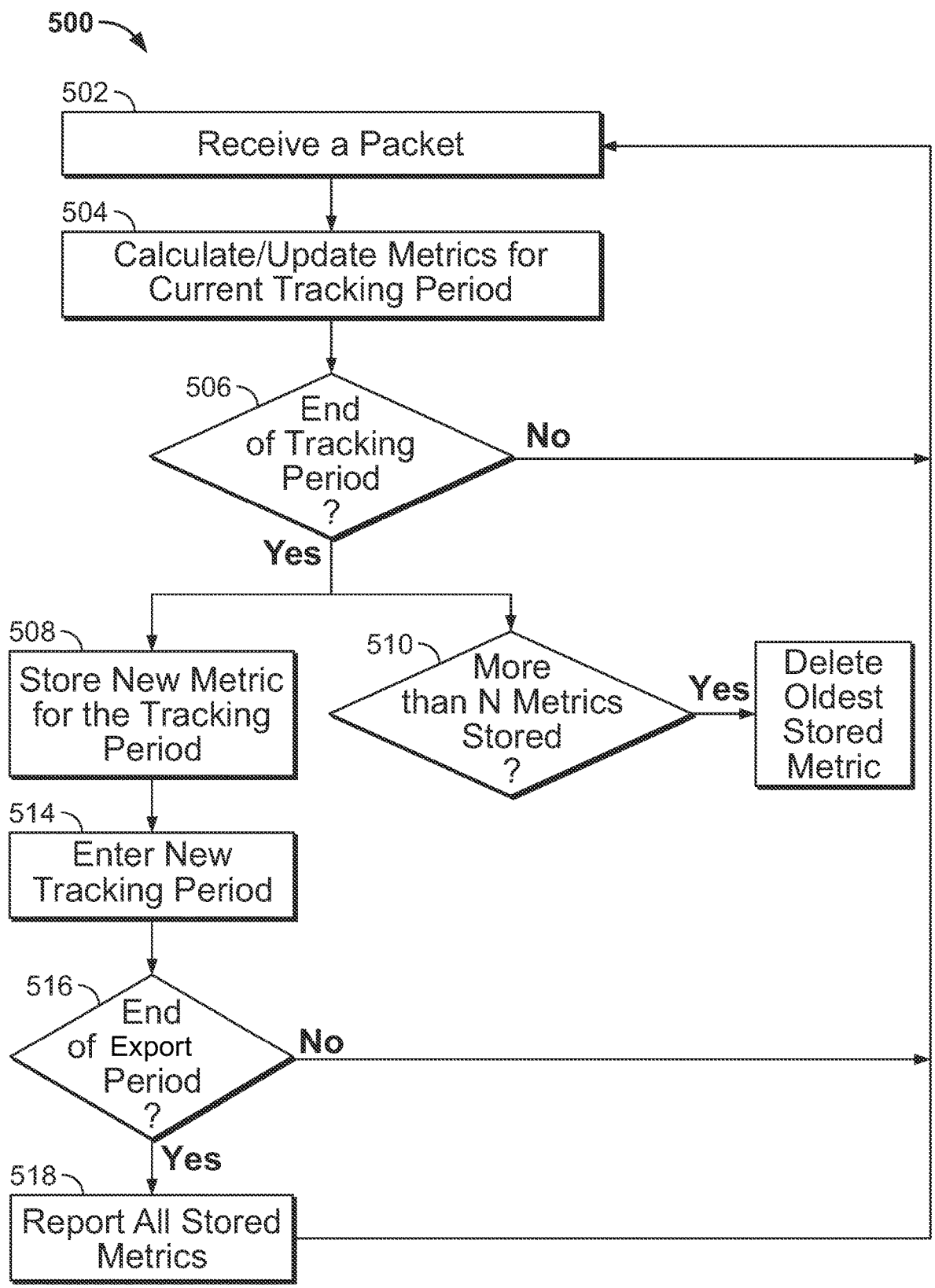
FIG. 5 is a flowchart of an illustrative process for collecting inband telemetry data, in accordance with some embodiments of the disclosure.

FIG. 5 is a flowchart of an illustrative process for collecting inband telemetry data, in accordance with some embodiments of the disclosure. For example, process 500 may be performed by control circuitry of a device (e.g., a packet-forwarding device or a network device). For example, the control circuitry may be control circuitry 604 of network device 602 of FIG. 6 as described below.

A process 500 for processing telemetry data begins at block 502, where control circuitry receives a packet. For example, a packet may be received using a network interface (e.g., interface 612). The packet may be received from an outside device or from an INT-enabled device and include INT data.

At 504, the control circuitry processes data from the packet received at step 502 (e.g., INT data) and updates metrics for the current tracking period (which is smaller than an export period). For example, the control circuitry may update latency for a flow to which the packet belongs for the current time period (e.g., as show in table 400) based on per-hop latency data of the packet.

At 506, control circuitry may check whether the current tracking period ended and a next one has begun. If not, the control circuitry returns to 502 and continues to receive and process packets for the current tracking period. If the current tracking period has ended, the device stores the metric computed for the current tracking period at step 508. For example, the new metric is stored in table 400 which is stored in memory (e.g., memory 606) of the device. Optionally, the control circuitry may check if more than a set number (N) of metrics has already been stored at step 510. If so, process 500 proceeds to step 512, where the oldest stored metric is deleted to make room for the new metric. In this way, no more than N metrics (e.g., one metric for each of N tracking time periods) may be stored at any one time.

At 514, the control circuitry enters the new tracking period and sets the new tracking period as the current tracking period. At 516, the control circuitry also checks if an end of an export time period is reached. If not, the control circuitry returns to step 502 and continues to receive and process packets to calculate a new telemetry metric for a new tracking period designated as current. If end of the export time period is reached, process 500 proceeds to step 518.

At 518, the control circuitry may report all stored metrics to a collector (e.g., collector 218). In some embodiments, the control circuitry may also report an aggregate metric for the entire export time period. In some embodiments, the stored metrics are not cleared after the report is transmitted. Instead, some of the old metrics (which are not deleted) may be reported again at an end of the next export time period to provide redundancy.

Figure 6:
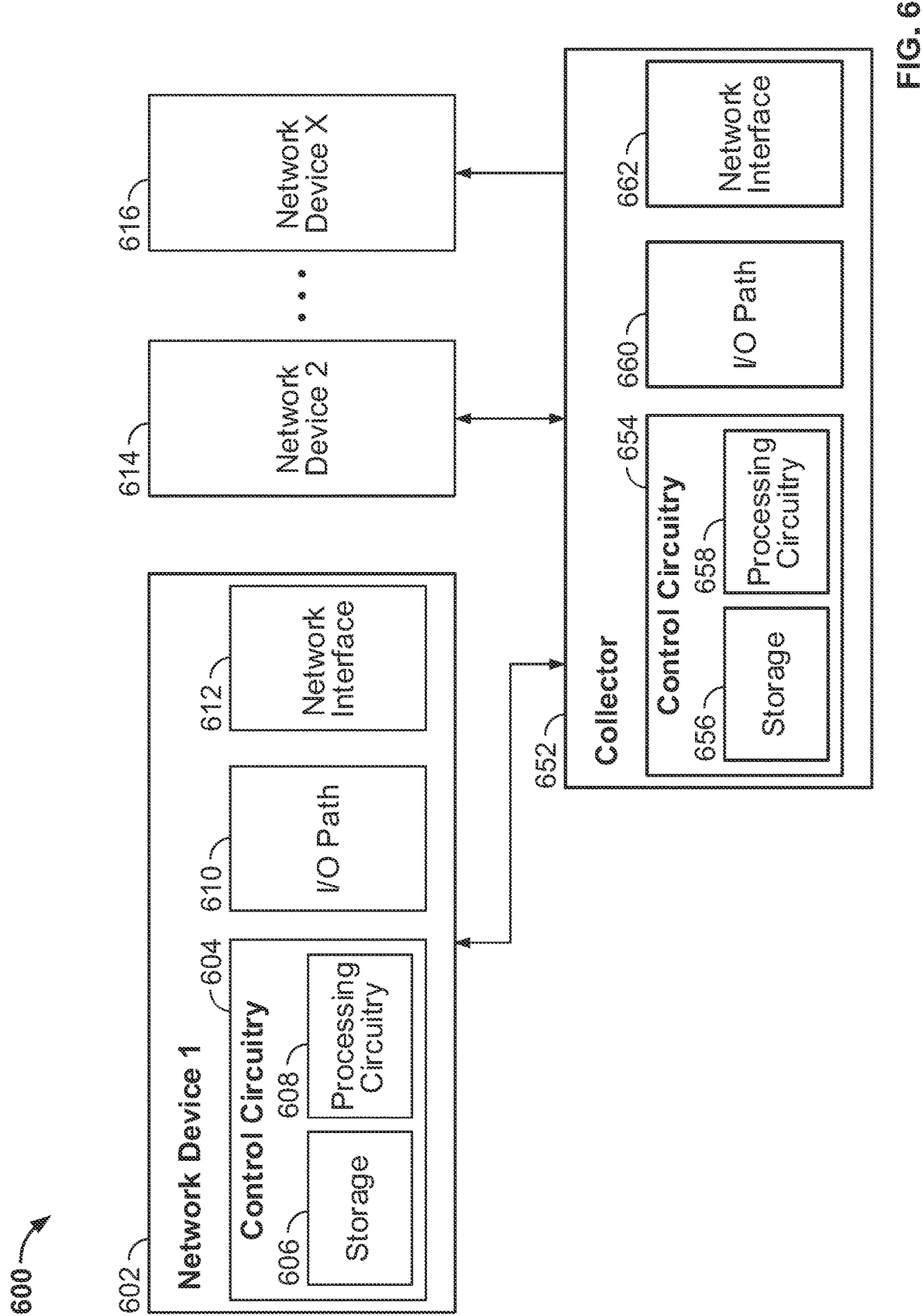
FIG. 6 shows a diagram of illustrative devices for collecting inband telemetry data, in accordance with some embodiments of the disclosure.

FIG. 6 shows a diagram of illustrative devices of a system 600 that includes network device 602, network devices 614-616, and collector 652. For example, device 602 may be the same as device 212, network device 614-616 may be the same as devices 208-210, and collector 652 may be the same as collector 218.

Device 602 may receive and send data via an input/output (I/O) path 610. I/O path 610 is communicatively connected to control circuitry 604, which includes processing circuitry 608 and storage (or memory) 606. Control circuitry 604 may send and receive commands, requests, and other suitable data using I/O path 610. I/O path 610 may connect control circuitry 604 (and specifically processing circuitry 608) to one or more network interfaces 612, which in turn connect device 602 to other devices on the network (e.g., network 204 or 140).

Control circuitry 604 may be based on any suitable processing circuitry, such as processing circuitry 608. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 604 executes instructions stored in memory (i.e., storage 606). For example, the instructions may cause control circuitry 604 to perform packet forwarding and INT operations described above and below.

Memory 606 may be an electronic storage device that is part of control circuitry 604. As referred to herein, the phrase "electronic storage device" or "storage device" should be understood to mean any device for storing electronic data, computer software, instructions, and/or firmware, such as random-access memory, hard drives, optical drives, solid state devices, quantum storage devices, or any other suitable fixed or removable storage devices, and/or any combination of the same. Nonvolatile memory may also be used. The circuitry described herein may execute instructions included in software running on one or more general purpose or specialized processors.

Control circuitry 604 may use network interface 612 to receive and forward packets to other network devices 614-616 (which may include hardware similar to that of device 602), e.g., over any kind of a wired or wireless network. In some embodiments, devices 602, 614, and 616 may be INT-enabled device. For example, memory 606 may include instructions for handling INT packets to collect and forward telemetry data as described above. In some embodiments, network device 602 may store a flow table in memory 606, where the flow table is established and updated as described above. Control circuitry may periodically forward data from the flow table to collector 652.

Collector 652 may include I/O path 660, network interface 662, and control circuitry 654 that includes processing circuitry 658 and storage 656. These elements may function similarly to elements 604-612 as described above. Collector 652 may be configured to receive and process telemetry data from all devices 602, 614, and 616 via network interface 662. In some embodiments, collector 652 may process all received INT data and use that data to make network-wide actions and generate reports.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A computer-implemented method for obtaining inband telemetry (INT) data from packets and periodically reporting the INT data, the method comprising:
   receiving, by a network device, a plurality of packets in a flow of data packets during a first export time period;
   based on determining that an end of the first export time period has been reached, sending to one or more collectors a plurality of first computed telemetry metrics in a first telemetry packet; and
   continually receiving, by the network device, a flow of second received packets in the flow of data packets during a second export time period; and
   updating a plurality of second computed telemetry metrics based on the flow of second received packets to modify a second computed telemetry metric.

2. The method of claim 1, wherein updating the plurality of computed INT metrics comprises computing a minimum, a maximum, an average, a variance, a jitter, a standard deviation, a mode, or any combination thereof of a corresponding INT metric.

3. The method of claim 1 further comprising:
   based on determining that an end of the first export time period has not been reached:
   continually receiving, by the network device, one or more further received packets in the flow of data packets; and
   updating a plurality of computed telemetry metrics based on the one or more further received packets to modify a first computed telemetry metric.

4. The method of claim 3, wherein the first export time period and the second export time period each correspond to an integer multiple of a tracking time period.

5. The method of claim 1, wherein the second export time period is greater than the first export time period.

6. The method of claim 1, wherein the INT data provides supplemental statistical information that is relevant to a plurality of first aggregated INT metrics when the first INT packet is not successfully sent to the one or more collectors.

7. The method of claim 1, wherein the INT data provides supplemental statistical information that is relevant to a plurality of second aggregated INT metrics when the second INT packet is not successfully sent to the one or more collectors.

8. One or more non-transitory computer-readable media storing computer-executable instructions that, when executed by a processor, perform a method of obtaining telemetry data from a flow of data packets and periodically reporting aggregated flow-based telemetry metrics, the method comprising:
   receiving, by a network device, a plurality of packets in the flow of data packets during a first export time period;
   based on determining that an end of the first export time period has been reached, sending to one or more collectors the plurality of first computed telemetry metrics in a first telemetry packet; and continually receiving, by the network device, a flow of second received packets in the flow of data packets during a second export time period; and updating a plurality of second computed telemetry metrics based on the flow of second received packets to modify a second computed telemetry metric.

9. The one or more non-transitory computer-readable media of claim 8, wherein the plurality of computed telemetry metrics comprise one or more of: per hop minimum latency, per hop maximum latency, per hop average latency, per hop variance of latency, per hop jitter of latency, per hop standard deviation of latency, and per hop mode of latency.

10. The one or more non-transitory computer-readable media of claim 8, wherein the first export time period comprises a plurality of tracking time periods of varying length.

11. The one or more non-transitory computer-readable media of claim 8, wherein the method further comprises:

based on determining that an end of the first export time period has not been reached:

continually receiving, by the network device, one or more further received packets in the flow of data packets; and updating a plurality of computed telemetry metrics based on the one or more further received packets to modify a first computed telemetry metric.

12. The one or more non-transitory computer-readable media of claim 11, wherein the one or more updated telemetry metrics comprise a plurality of flow telemetry metrics of the first export time period.

13. The one or more non-transitory computer-readable media of claim 8, wherein the one or more updated telemetry metrics comprise packet flow telemetry metrics calculated for tracking time periods during which at least one packet of the received packet flow was received.

14. The one or more non-transitory computer-readable media of claim 8, wherein the telemetry data provides additional statistical information that is relevant to the plurality of second computed telemetry metrics when the second telemetry packet is not received by the collector.

15. A network device comprising:

one or more memories storing computer readable instructions configured to cause one or more processors to store telemetry metrics in an aggregation table, the aggregation table comprising a plurality of first aggregated telemetry metrics and a plurality of second aggregated telemetry metrics, each of the first and second plurality of aggregated telemetry metrics corresponding to a telemetry characteristic;

a control circuitry configured to:

continually receive, during a first export time period and a second export time period, a corresponding plurality of first received packets and a plurality of second received packets in a packet flow;

continually update a first plurality of first aggregated telemetry metrics in the aggregation table based on telemetry data associated with the plurality of first received packets;

continually update a second plurality of second aggregated telemetry metrics in the aggregation table based on telemetry data associated with the plurality of second received packets; and a communication circuitry configured to:

at an end of the first export time period, send to a network collector the plurality of aggregated telemetry metrics in the aggregation table.

16. The network device of claim 15, wherein the plurality of aggregated telemetry metrics comprises one or more of: per hop minimum latency, per hop maximum latency, per hop average latency, per hop variance of latency, per hop jitter of latency, per hop standard deviation of latency, and per hop mode of latency.

17. The network device of claim 15, wherein the first export time period is longer than a threshold export time period.

18. The network device of claim 15, wherein the first export time period comprises an integer multiple of a time period.

19. The network device of claim 18, wherein the second export time period is smaller than an integer multiple of the time period.

20. The network device of claim 19, wherein the telemetry data provides supplemental statistical information that is relevant to the plurality of aggregated telemetry metrics when the second telemetry packet is not successfully sent to the one or more collectors.

* * * * *